US012737043B2

(12) United States Patent
Zhao et al.

(10) Patent No.: US 12,737,043 B2
(45) Date of Patent: Sep. 15, 2026

(54) METHOD FOR RETRIEVING IN-SITU BUILDING INFORMATION BASED ON VISUAL GAZE

(71) Applicant: Beijing University Of Technology, Beijing (CN)

(72) Inventors: Xuefeng Zhao, Beijing (CN); Haodong Chen, Beijing (CN)

(73) Assignee: Beijing University Of Technology, Beijing (CN)

( * ) Notice: Subject to any disclaimer, the term of this patent is extended or adjusted under 35 U.S.C. 154(b) by 0 days.

(21) Appl. No.: 19/246,518

(22) Filed: Jun. 23, 2025

(65) Prior Publication Data

US 2026/0079570 A1 Mar. 19, 2026

(30) Foreign Application Priority Data

Jun. 26, 2024 (CN) ......................... 202410839876.9

(51) Int. Cl.
*G06F 3/01* (2006.01)
*G06T 17/20* (2006.01)
*G06T 19/20* (2011.01)

(52) U.S. Cl.
CPC ............ *G06F 3/013* (2013.01); *G06T 17/205* (2013.01); *G06T 19/20* (2013.01);
(Continued)

(58) Field of Classification Search
CPC ........ G06F 3/013; G06F 30/13; G06F 16/583; G06T 17/205; G06T 19/20; G06T 2200/24; G06T 2210/04; G06T 2210/21; G06T 2219/2016; G06T 15/005; G06T 19/003; G06T 19/006; G06V 40/18
See application file for complete search history.

(56) References Cited

U.S. PATENT DOCUMENTS 12,223,472 B2 * 2/2025 Jung ....................... G06T 19/20

OTHER PUBLICATIONS

CNIPA First Office Action, Application No. 20410839876.9, issued Nov. 5, 2024, pp. 1-3, Chinese original.

(Continued)

*Primary Examiner* — Said Broome
*Assistant Examiner* — Jordan Wan Yick
(74) *Attorney, Agent, or Firm* — Nitin Kaushik

(57) ABSTRACT

A method for retrieving in-situ building information based on visual gaze is disclosed, including: extracting and optimizing a building information model; obtaining gaze data; aligning the BIM model with a physical structure of the building through a spatial anchors technology; and wearing MR device for on-site building information retrieval. Based on MR technology, the present invention provides a visual gaze retrieval method for building information with real building components as the carrier. The MR technology is used to link and bind the digital information of building components with the physical entities of building components; the eye tracking technology is used to perform the visual information retrieval of building components. Users can rapidly obtain relevant building information, such as material properties and design parameters, by gazing at real building components, which improves the efficiency of on-site work and brings significant improvement and convenience to the construction industry.

4 Claims, 5 Drawing Sheets

(52) U.S. Cl.
CPC ...... *G06T 2200/24* (2013.01); *G06T 2210/04* (2013.01); *G06T 2210/21* (2013.01); *G06T 2219/2016* (2013.01)

(56) References Cited

OTHER PUBLICATIONS

CNIPA First Office Action, Application No. 20410839876.9, issued Nov. 5, 2024, pp. 1-5, English translation.
Title of the Item: CN20410839876.9-CNIPA First Office Action Issuance Date: Nov. 5, 2024 Applicant: Beijing University of Technology Country: CN.

* cited by examiner

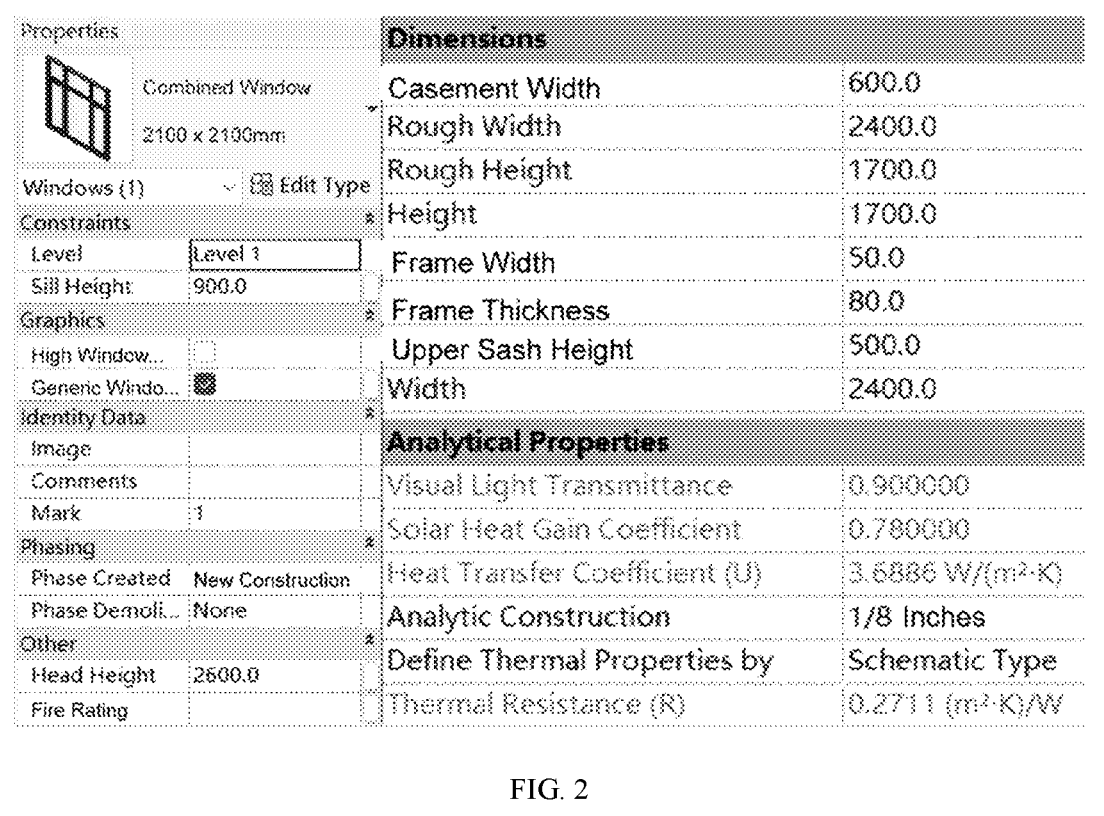

| Properties | |
|---|---|
| Combined Window 2100 x 2100mm | |
| Windows (1) | Edit Type |
| **Constraints** | |
| Level | Level 1 |
| Sill Height | 900.0 |
| **Graphics** | |
| High Window... | |
| Generic Windo... | |
| **Identity Data** | |
| Image | |
| Comments | |
| Mark | 1 |
| **Phasing** | |
| Phase Created | New Construction |
| Phase Demoli... | None |
| **Other** | |
| Head Height | 2600.0 |
| Fire Rating | |

| **Dimensions** | |
|---|---|
| Casement Width | 600.0 |
| Rough Width | 2400.0 |
| Rough Height | 1700.0 |
| Height | 1700.0 |
| Frame Width | 50.0 |
| Frame Thickness | 80.0 |
| Upper Sash Height | 500.0 |
| Width | 2400.0 |
| **Analytical Properties** | |
| Visual Light Transmittance | 0.900000 |
| Solar Heat Gain Coefficient | 0.780000 |
| Heat Transfer Coefficient (U) | 3.6886 W/(m²·K) |
| Analytic Construction | 1/8 Inches |
| Define Thermal Properties by | Schematic Type |
| Thermal Resistance (R) | 0.2711 (m²·K)/W |

FIG. 2

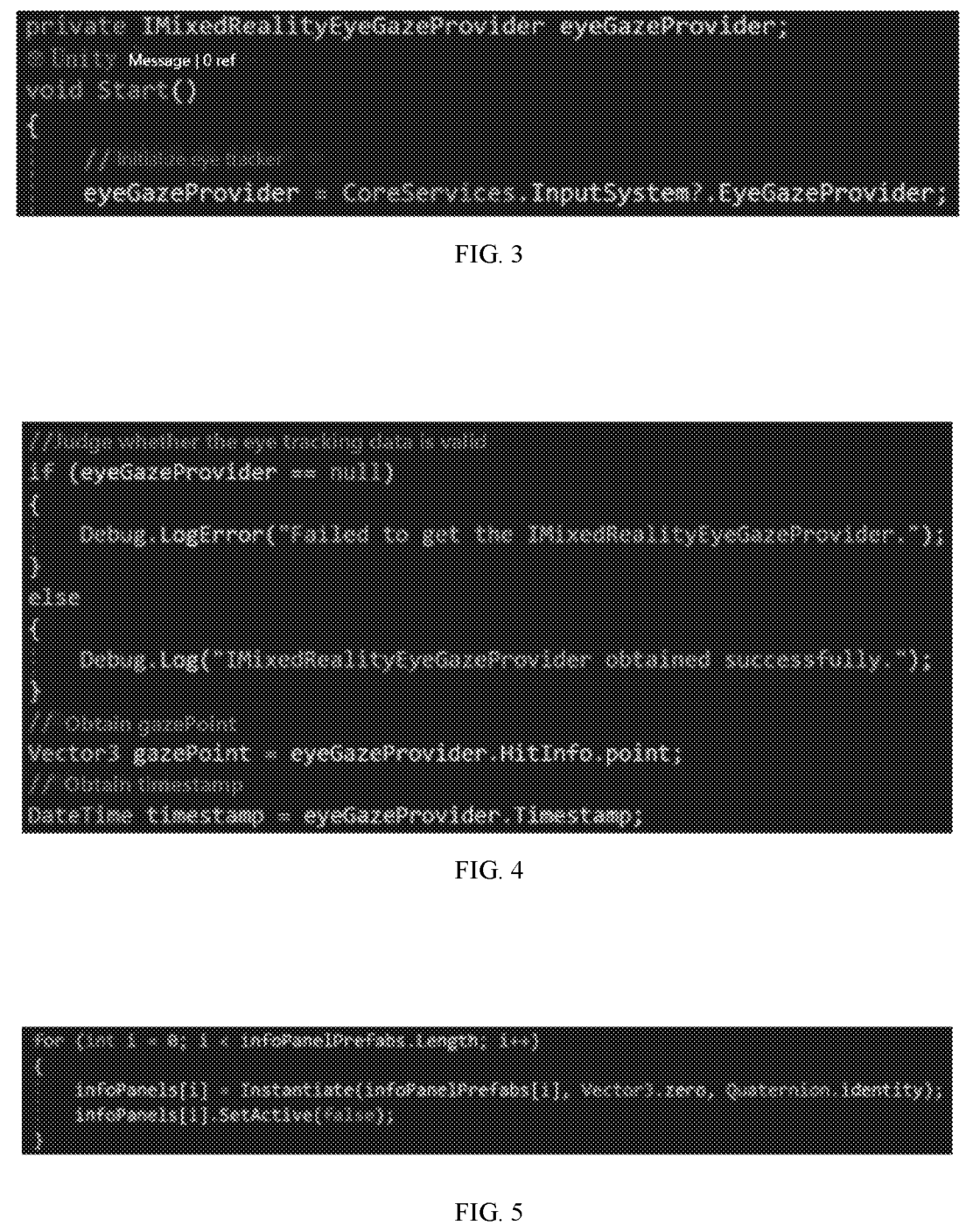

```
private IMixedRealityEyeGazeProvider eyeGazeProvider;
Unity Message | 0 ref
void Start()
{
    // [illegible]
    eyeGazeProvider = CoreServices.InputSystem?.EyeGazeProvider;
```

FIG. 3

```
//Judge whether the eye tracking data is valid
if (eyeGazeProvider == null)
{
    Debug.LogError("Failed to get the IMixedRealityEyeGazeProvider.");
}
else
{
    Debug.Log("IMixedRealityEyeGazeProvider obtained successfully.");
}
// Obtain gazePoint
Vector3 gazePoint = eyeGazeProvider.HitInfo.point;
// Obtain timestamp
DateTime timestamp = eyeGazeProvider.Timestamp;
```

FIG. 4

```
for (int i = 0; i < infoPanelPrefabs.Length; i++)
{
    infoPanels[i] = Instantiate(infoPanelPrefabs[i], Vector3.zero, Quaternion.identity);
    infoPanels[i].SetActive(false);
}
```

FIG. 5

METHOD FOR RETRIEVING IN-SITU BUILDING INFORMATION BASED ON VISUAL GAZE

TECHNICAL FIELD

The present invention relates to the field of civil engineering and intelligent construction, particularly a method for retrieving in-situ building information based on visual gaze.

BACKGROUND

As the core of the modern construction industry, Building Information Modeling (BIM) technology can be used to efficiently plan, design, construct, and manage construction projects. All aspects of a building can be simulated and analyzed throughout its entire life cycle by building professionals through detailed digital models created by BIM. However, conventional information retrieval methods require consulting paper drawings or digital files on mobile devices to obtain building information, and this process typically involves frequent searching and comparison of drawings, which is often time-consuming and inefficient. Furthermore, it is difficult to combine the information in the drawings with the actual on-site conditions in an intuitive manner as the information integration is not intuitive, which increases the difficulty of understanding and applying the information. Although BIM technology can enhance the understanding of drawing information by visualizing two-dimensional drawings in three dimensions, there are several challenges in its actual application on site: (1) Conventional BIM technology relies on desktop software, which tends to be limited by the performance and portability of mobile devices when applied to actual construction sites. (2) BIM technology requires high professional skills from users, and for large or complex construction projects, a great deal of time may be required to find specific information among numerous components based solely on the software interface. (3) There are still challenges in effectively combining BIM models with the physical environment of actual construction sites.

The introduction of mixed reality (MR) technology provides new solutions to overcome these challenges. As an emerging technology in the field of physical and digital interaction, MR technology provides a method for combining the real and virtual worlds, thereby creating a mixed reality space that integrates people, computers, and the environment. In this space, the understanding of the real environment can be enhanced for people with the help of digital computer information. In this space, the integration of digital models and the actual construction environment can be intuitively seen by engineers and construction personnel.

The introduction of eye tracking technology has brought a breakthrough improvement in the application of MR technology in BIM. This technology allows users to interact with BIM models through eye tracking, providing a more intuitive and efficient way to retrieve information. Through eye tracking, users can directly gaze at a specific building component, and the system will immediately display detailed information about that component, such as material properties and design parameters, thereby greatly improving the efficiency and accuracy of information retrieval. The application of this technology not only enhances the practicality of MR in building design, construction, operations and maintenance, but also provides users with a more natural and immersive interactive experience.

SUMMARY

In view of the above problems, the present invention aims to provide a method for retrieving in-situ building information based on visual gaze, the method includes the following steps:

- step 1, extracting and exporting a BIM model into a Filmbox (FBX) format in Autodesk Revit, optimizing the model to reduce a number of triangular meshes, then configuring a mixed reality development environment in Unity and importing the optimized model, and achieving functions of grabbing, moving, rotating and zooming for the BIM model based on a Mixed Reality Toolkit (MRTK);
- step 2, writing C# code to initialize an eye gaze provider in MRTK, writing code to determine a validity of eye-tracking data, obtain a user gaze position, and access a relevant timestamp;
- step 3, in Unity, creating an information panel for the BIM model component and setting an initial invisible state, activating the information panel only when the user gazes. Monitoring user gaze points by using algorithms, and activating and positioning panels based on interaction thresholds, simultaneously adding scripts to automatically adjust panel orientation to optimize an interaction experience;
- step 4, compiling projects by Visual Studio and releasing to MR device;
- step 5, aligning the BIM model with a physical entity of the building component through a spatial anchors technology; and
- step 6, wearing the MR device, when the user gazes at a certain building component, automatically identifying a gaze object and displaying detailed information of the component in a user's field of view through the system, wherein the detailed information includes material properties, size specifications, etc, and achieving in-situ building information retrieval based on visual gaze.

Further, in step 1, the following steps can be performed in sequence:

- step 1.1: extracting building design and structural information by using Autodesk Revit as a main BIM software, including detailed components and material properties; exporting the BIM model in Revit to the FBX format;
- step 1.2: optimizing the model exported from Revit to reduce the number of triangular meshes;
- step 1.3: configuring the mixed reality development environment in Unity and importing the building model information into Unity, based on the MRTK toolkit, mounting 'NearInteractionGrabbable.cs', 'ManipulationHandler.cs', 'BoundingBox.cs', and 'Interactable.cs' on the BIM model in sequence to implement the functions of grabbing, moving, rotating and zooming for the BIM model.

Further, in step 2, the following steps can be performed in sequence:

- step 2.1: activating and configuring an MRTK eye gaze provider;
- step 2.2: writing C# code in Visual Studio to determine the validity of eye-tracking data, obtain the gaze point position data, and acquire timestamps to maintain data synchronization.

Further, in step 3, the following steps can be performed in sequence:

step 3.1: in Unity, creating the information panel for each component and writing C# code to activate the information panel only when gazing;

step 3.2: using an 'Update' method of Unity to monitor the user gaze point every frame, and processing the gaze data in real-time with a self-developed algorithm to determine object selection and switching;

step 3.3: in Unity, adding a 'BoxCollider' collider to the model component, performing a collision detection with the self-developed algorithm, and activating the corresponding information panel when a collision occurs;

step 3.4: in Unity, dynamically positioning the information panel adjacent to the gaze point by using the self-developed algorithm and adjusting it to an appropriate viewing size;

step 3.5: in Unity, optimizing an information panel display logic to ensure the information panel remains facing the user at all times.

Further, in step 4, the project is packaged into a Visual Studio Solution file, the project is compiled into ARM64 format by using Visual Studio, and released as an APPX format installation package. The project is deployed to MR device via a Wi-Fi connection.

Further, in step 5, the following steps can be performed in sequence:

step 5.1: aligning the BIM model with the physical entity of the building component through the functions of grabbing, moving, rotating and zooming added in step 1.3, creating the spatial anchors for the BIM model through the MRTK toolkit in combination with a spatial mapping of MR device, and locking the BIM model in the space, so as to achieve a link and a binding between the digital information of the building component and the physical entity of the building component;

step 5.2: verifying an accuracy of alignment of the model with the physical entity of the building component through in-situ testing, so that a deviation is less than 1 cm.

Further, in step 6, when the user wears the MR device at the construction site, the system can identify and respond to the user gaze point in real-time. When the user gazes at the building entity, the system immediately displays corresponding model information based on the gaze point, such as material properties and design parameters.

The advantages and positive effects of the present invention are as follows:

(1) Innovative application of MR in civil engineering. The present invention combines the MRTK with a self-developed algorithm and uses eye tracking technology to retrieve building information in the field of civil engineering. This innovative application combines MR technology with civil engineering, creating a new field of information retrieval and building model interaction, and improving the efficiency and accuracy of information acquisition in the building design and construction process.

(2) Real-time 'what you see is what you get' information retrieval and in-situ display. The present invention achieves a 'what you see is what you get' interactive experience through eye tracking technology and the computing power of MR device. When users gaze at specific building components in the real space, the system can immediately identify the focus of the user's gaze and display relevant detailed attribute information, such as material properties and design parameters, at the corresponding position in situ. This intuitive information retrieval method not only significantly improves the speed and accuracy of data acquisition but also enhances the cognitive efficiency and immersion of users, thereby optimizing the interactivity and efficiency of on-site work.

(3) The interactivity and efficiency of on-site work are improved. The interactive method of the present invention greatly improves the interactivity and efficiency of on-site work. The present invention solves the problems of complex operation and inefficient information acquisition in the on-site application of conventional BIM technology, reduces the dependence on professional skills, and simplifies the cumbersome drawing viewing process. The time delay and complexity of information retrieval and display in conventional methods are eliminated, allowing users to obtain the required data while visually exploring the building environment.

In summary, the present invention achieves the method for generating code for retrieving in-situ building information based on visual gaze by innovatively integrating eye tracking technology and MR technology into the retrieval and interaction of building information. This method directly uses the gaze point of the user to obtain detailed information about building components and displays it in real-time in real space, which greatly improves the efficiency, and accuracy of information retrieval, and the naturalness of interaction. During the construction process, particularly during the construction acceptance stage, the application of the present invention allows the construction team to accurately and quickly inspect and confirm engineering details. During the building operation and maintenance stage, the present invention provides an efficient asset management tool for operation and maintenance staff. Eye tracking provides quick access to relevant information about key building components, such as maintenance records, performance data, etc., so that the operation and maintenance management are more efficient and accurate. This direct and real-time information access greatly improves the efficiency and effectiveness of building facilities maintenance. The application of the present invention not only optimizes the workflow of users, and also enhances the interactivity and immersion of the on-site work, demonstrating the huge potential and value of digital transformation in the construction industry, which provides strong support for the sustainable development of the civil engineering field.

BRIEF DESCRIPTION OF THE DRAWINGS

The foregoing and/or other aspects and advantages of the present invention will become clearer and more readily understood by a detailed description in conjunction with the following accompanying drawings, the drawings are schematic only and do not limit the present invention, where:

FIG. 2 is an example diagram of information extraction based on a BIM technology.

FIG. 3 is an example diagram of an initialized eye gaze provider in a self-developed algorithm.

FIG. 4 is an example diagram of a method for obtaining gaze data in a self-developed algorithm.

FIG. 5 is an example diagram of a state management of an information panel in a self-developed algorithm.

DETAILED DESCRIPTION OF THE EMBODIMENTS

In order to make the above objectives, features, and advantages of the present invention more obvious and understandable, the present invention will be further described in detail below with reference to the accompanying drawings and specific embodiments.

Figure 1:
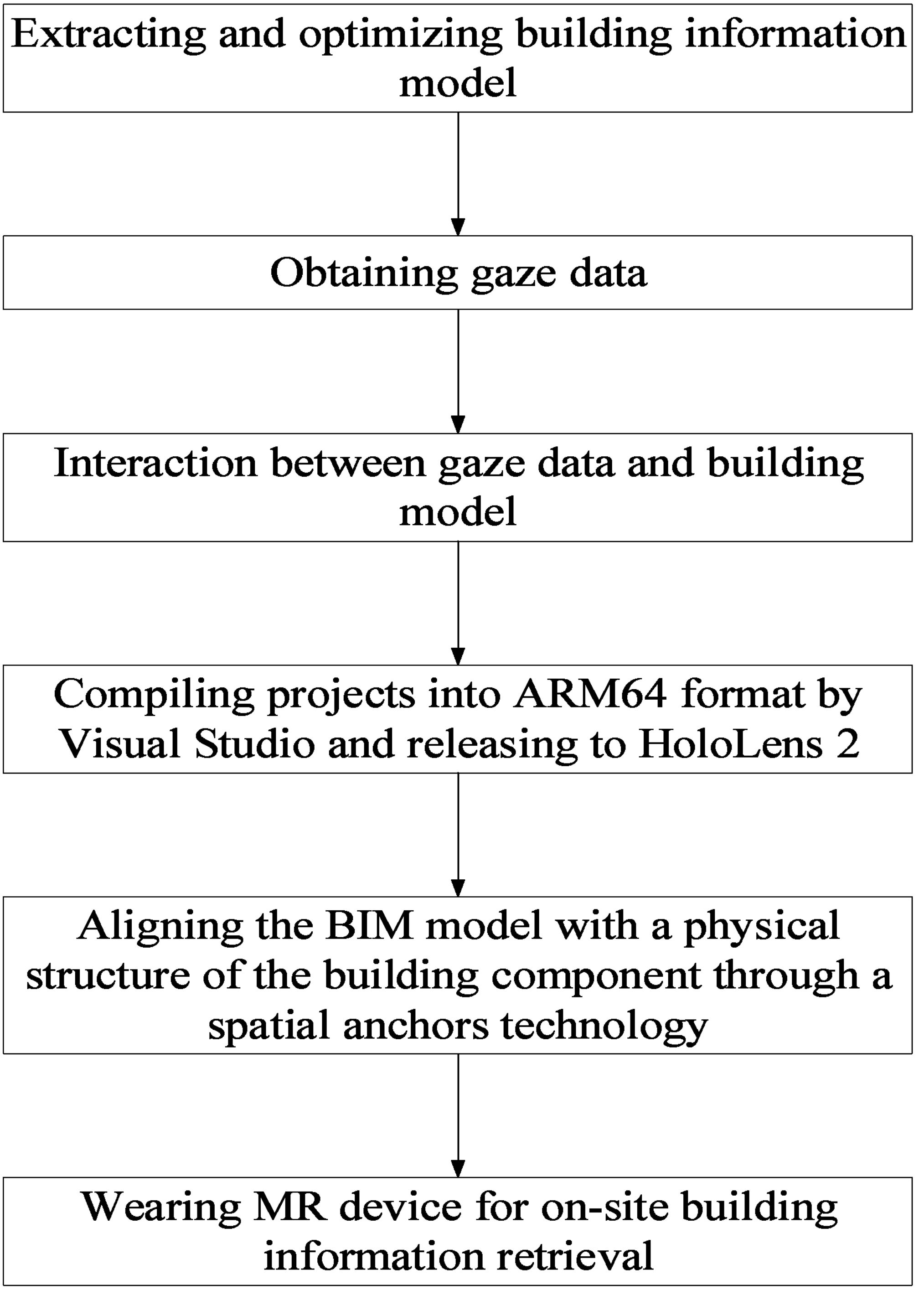
FIG. 1 is a flow chart of a method generating code for for retrieving in-situ building information based on visual gaze.

As shown in FIG. 1, the present invention provides a method for generating code for retrieving in-situ building information based on visual gaze, the method includes the following steps:

- step 1, the BIM model is extracted and exported into the FBX format in Autodesk Revit, the model is optimized to reduce the number of triangular meshes, then the mixed reality development environment is configured in Unity and the optimized model is imported, and the functions of grabbing, moving, rotating and zooming for the BIM model is achieved based on the MRTK;
- step 2, C# code is written to initialize the eye gaze provider in MRTK, the code is written to determine the validity of eye-tracking data, the user gaze position is obtained, and the relevant timestamp is accessed;
- step 3, in Unity, the information panel is created for the BIM model component and the initial invisible state is set, the information panel is activated only when the user gazes. The user gaze points are monitored by using algorithms, and the panels are activated and positioned based on interaction thresholds, the scripts are simultaneously added to automatically adjust panel orientation to optimize the interaction experience;
- step 4, projects are compiled by Visual Studio and released to MR device;
- step 5, the BIM model is aligned with the physical entity of the building component through the spatial anchors technology; and
- step 6, the MR device is worn, when the user gazes at a certain building component, the gaze object is automatically identified and detailed information of the component is displayed in the user's field of view through the system, wherein the detailed information includes material properties, size specifications, etc, and achieving in-situ building information retrieval based on visual gaze.

Further, in step 1, the following steps may be performed in sequence:

- step 1.1: the required component information is exported from Revit, including but not limited to material properties, size parameters, etc., as shown in FIG. 2, and the BIM model is exported in Revit to the FBX format;
- step 1.2: the PiXYZStudio software is used to optimize the FBX format model exported from Revit, the Optimize Mesh operation is performed to reduce the number of polygons to improve the rendering efficiency and fluency of the model on the MR device.
- step 1.3: the mixed reality development environment is configured in Unity and the building model information is imported into Unity, based on the MRTK toolkit, 'NearInteractionGrabbable.cs', 'ManipulationHandler.cs', 'BoundingBox.cs', and 'Interactable.cs' are mounted on the BIM model in sequence to implement the functions of grabbing, moving, rotating and zooming for the BIM model.

Further, in step 2, the following steps can be performed in sequence:

- step 2.1: the MRTK eye gaze provider is initialized, in the 'Start' method of the Unity, C# code is written to initialize the 'IMixedRealityEyeGazeProvider' object to obtain and process eye-tracking data, as shown in FIG. 3;
- step 2.2: C# code is written in Visual Studio to determine whether the eye-tracking data is valid and obtain the current gaze point position of users, 'eyeGazeProvider.Timestamp' is accessed to obtain the timestamp associated with the current gaze data to maintain data synchronization, as shown in FIG. 4.

Figure 6:
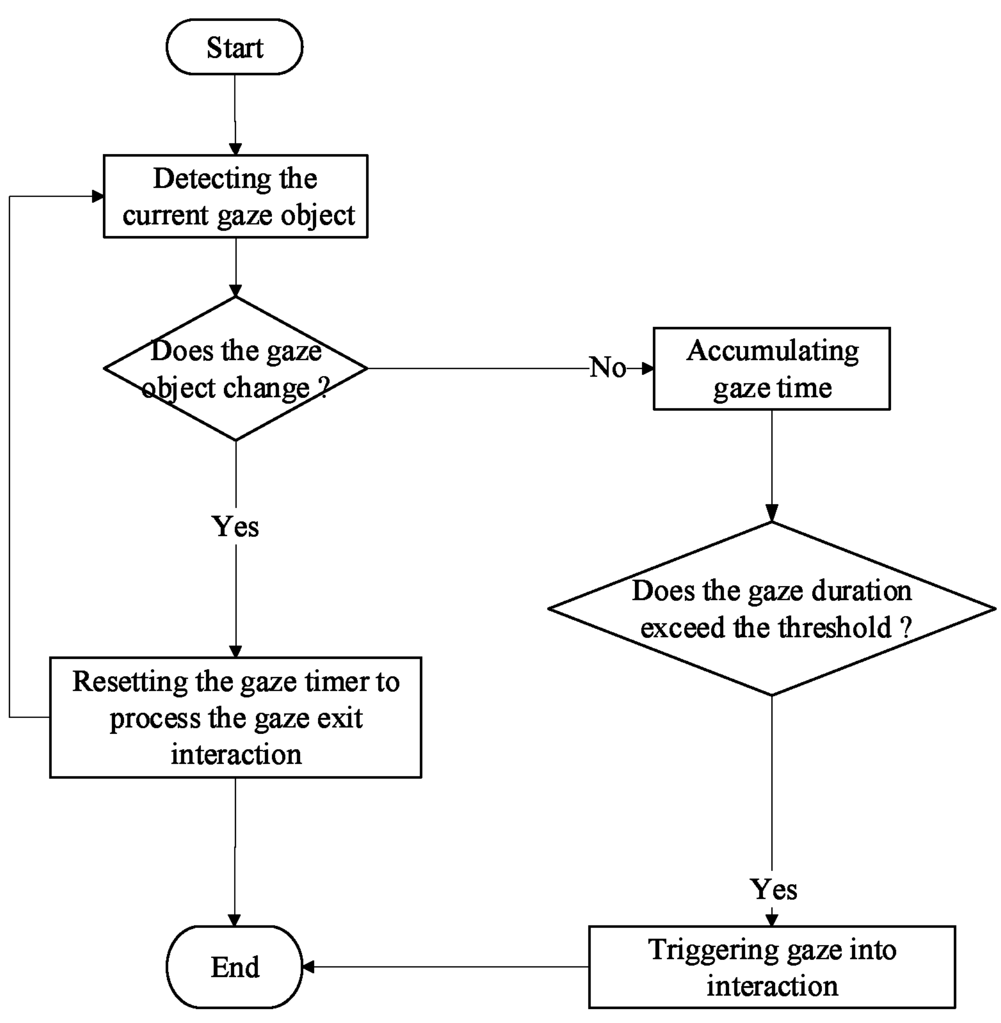
FIG. 6 is an example diagram of a detection and processing for real-time gaze points in a self-developed algorithm.

Further, in step 3, the following steps can be performed in sequence:

- step 3.1: the information panel is created for each component, and the information panel is stored in an array in the form of Unity Prefabs; the Unity engine 'SetActive (false)' instruction is called to set the initial state of all the information panels to be invisible, so that the panels are activated only when gazing, as shown in FIG. 5.
- Step 3.2: the 'Update' method of Unity is used to monitor the user gaze point per frame, and the intersection of the user gaze and the object in the scene is determined by combining the self-developed algorithm. The algorithm analyzes the gaze time to complete the object selection and processes the switching of the gaze object. A threshold 'gazeStay Threshold' is set to determine the minimum gaze stay duration required to trigger the interaction, which is 1 second. The 'gazeTimer' variable is used to record the gaze stay duration of the user on the current gaze object. When the gaze focus of the user changes, the 'gazeTimer' is reset and the interaction of gaze shifting is processed. When the gaze time of the user on the same object exceeds the set threshold, the selection of the gaze object is completed, as shown in FIG. 6.

Step 3.3: in Unity, the 'Box Collider' collider is added to the imported BIM model component. When the gazing ray collides with the collision body, the BIM model component information of the collision body is returned and the corresponding information panel is activated.

Step 3.4: according to the self-developed algorithm to record the user gaze point position, the optimal display position of the information panel is calculated by combining with the preset distance parameters. When the gazing ray collides with the collision body, the activated information panel is moved to the calculated optimal display position.

Step 3.5: the 'billboard.cs' and 'radialview.cs' scripts are added to the information panel to automatically adjust the orientation of the information panel to ensure the information panel remains facing the user at all times, thereby improving the readability and interactive experience of the information. The 'billboard.cs' script makes the panel always face the gaze direction of the user, and the 'radialview.cs' script is used to maintain the specific position and angle of the panel relative to the user. In this way, even if the user moves or turns, the information on the panel is always easy to watch and interact.

Further, in Step 4, the project is packaged into the Visual Studio Solution file, the project is compiled into ARM64 format by using Visual Studio, and released as an APPX format installation package. The project is deployed to MR device via the Wi-Fi connection.

Figure 7:
FIG. 7 is an example diagram of aligning a BIM model with a building entity based on a spatial anchors technology.

Further, in step 5, the following steps can be performed in sequence:

step 5.1: the BIM model is aligned with the physical entity of the building component through the functions of grabbing, moving, rotating and zooming added in step 1.3, the spatial anchors are created for the BIM model through the MRTK toolkit in combination with the spatial mapping of MR device, and the BIM model is locked in the space, and the link and the binding between the digital information of the building component and the physical entity of the building component are achieved, as shown in FIG. 7.

Step 5.2: the accuracy of alignment of the model with the physical entity of the building component is verified through the in-situ testing, so that the deviation is less than 1 cm.

Figure 8:
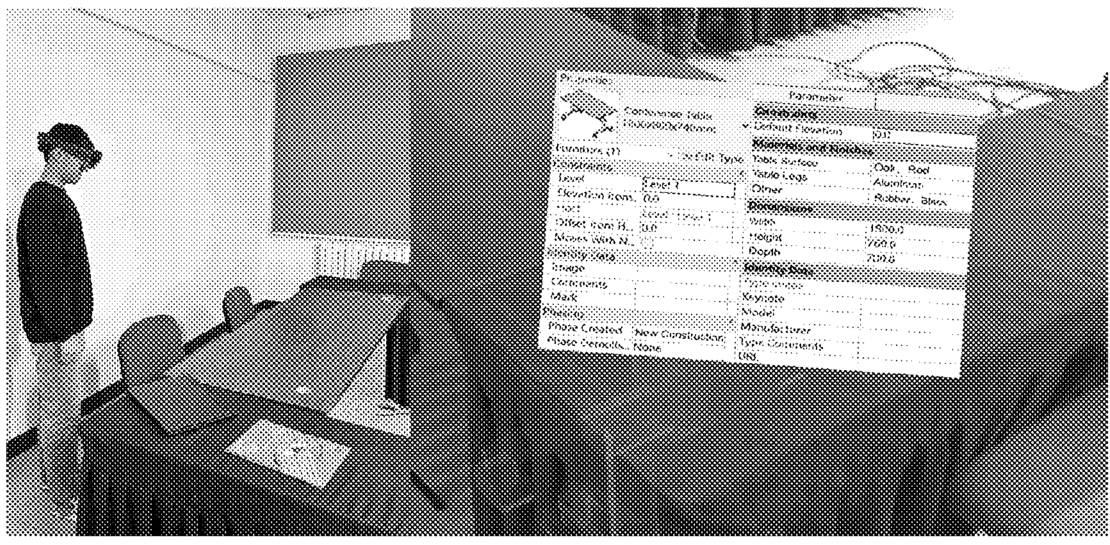
FIG. 8 is an example diagram of a method for retrieving in-situ building information based on visual gaze.

Further, in step 6, the user wears the MR device at the construction site, as shown in FIG. 8, the system can identify and respond to the user gaze point in real-time. When the user gazes at the building entity, the system immediately displays corresponding model information based on the gaze point, such as material properties and design parameters.

The method for retrieving in-situ building information based on visual gaze provided by the present invention is applied to the all life cycle of civil engineering and intelligent construction by integrating eye tracking technology, MR technology and building information model technology. This method directly uses the gaze point of the user to obtain detailed information about building components and displays it in real-time in real space, which greatly improves the efficiency, and accuracy of information retrieval, and the naturalness of interaction. Through the self-developed algorithm, the Unity engine and MR device may avoid the use of desktop BIM software in the engineering site. During the construction process, particularly during the construction acceptance stage, the application of the present invention allows the construction team to accurately and quickly inspect and confirm engineering details. During the building operation and maintenance stage, the present invention provides an efficient asset management tool for operation and maintenance staff. Eye tracking provides quick access to relevant information about key building components, such as maintenance records, performance data, etc., so that the operation and maintenance management are more efficient and accurate. This direct and real-time information access greatly improves the efficiency and effectiveness of building facilities maintenance. The application of the present invention not only optimizes the workflow of users, it also enhances the interactivity and immersion of on-site work, demonstrating the huge potential and value of digital transformation in the construction industry, which provides strong support for the sustainable development of the civil engineering field.

The present invention is not limited to the above-described embodiments. Anyone inspired by the present invention may derive various other forms of products. However, any changes made to the shape or structure of the product, or any technical solutions that are the same or similar to those described in this application fall within the scope of protection of this invention.

What is claimed is:

1. A method for retrieving in-situ building information based on visual gaze, executed through a mixed reality (MR) device worn by a user in a physical space, the MR device comprising an eye tracker, wherein the method comprises the following steps:

Step 1, importing a Building Information Modeling (BIM) into a mixed reality development environment configured in Unity through the MR device, spatially aligning the BIM with a physical entity of a building component in the physical space, and locking the BIM in the physical space using spatial anchors technology to achieve linking and binding between digital information of the building component and the physical entity of the building component;

Step 2, using the eye tracker to acquire user gaze position data in real time, and acquiring timestamp associated with the current user gaze position data to maintain data synchronization;

Step 3, by monitoring the user gaze position data, using a floating-point variable to record a gaze stay duration of the user on a current gaze target;

Step 4, when the gaze stay duration exceeds a set threshold, automatically identifying the building component gazed at by the user, and retrieving detailed information of the building component from the BIM, wherein the set threshold is a minimum gaze stay duration required to trigger interaction, and the detailed information includes material properties and size specifications;

Step 5, displaying an information panel in the user's field of view through the MR device, and displaying the detailed information of the building component in real time via the information panel in situ of the building component in the physical space; wherein, the information panel corresponds one-to-one with the building component in the physical space; an initial state of each information panel is invisible, and the information panel is activated for display when the corresponding building component is gazed at; and an orientation of the information panel is automatically adjusted based on the gaze position data to ensure that it always faces the user's line of sight.

2. The method for retrieving in-situ building information based on visual gaze according to claim 1, wherein in step 2, the following steps can be performed in sequence:

step 2.1: activating and configuring an MRTK eye gaze provider;

step 2.2: writing C# code in Visual Studio to determine the validity of eye-tracking data, obtain gaze point position data and acquire timestamps to maintain data synchronization.

3. The method for retrieving in-situ building information based on visual gaze according to claim 1, wherein the step 5 further comprises:

in Unity, creating the information panel for each component and writing C# code to activate the information panel only when gazing;

using an 'Update' method of Unity to monitor a user gaze point every frame, and processing a gaze data in real-time to determine object selection and switching;

in Unity, adding a 'BoxCollider' collider to a model component, performing a collision detection, and activating a corresponding information panel when a collision occurs;

in Unity, dynamically positioning the information panel adjacent to the gaze point and adjusting it to an appropriate viewing size;

in Unity, optimizing an information panel display logic to ensure the information panel remains facing the user at all times.

4. The method for retrieving in-situ building information based on visual gaze according to claim 1, wherein the step 1 further comprises:

aligning the BIM model with the physical entity of the building component through the functions of grabbing, moving, rotating and zooming added in step 1.3, creating the spatial anchors for the BIM model through the MRTK toolkit in combination with a spatial mapping of MR device, and locking the BIM model in the space, so as to achieve the link and the binding between the digital information of the building component and the physical entity of the building component;

verifying an accuracy of alignment of the model with the entity building through in-situ testing, so that a deviation is less than 1 cm.

* * * * *